United States Patent
Oshima et al.

(10) Patent No.: US 8,221,287 B2
(45) Date of Patent: Jul. 17, 2012

(54) VEHICLE AND CONTROLLER THEREOF

(75) Inventors: Takeru Oshima, Kobe (JP); Takuya Sakamoto, Akashi (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 471 days.

(21) Appl. No.: 12/481,793

(22) Filed: Jun. 10, 2009

(65) Prior Publication Data

US 2009/0312147 A1 Dec. 17, 2009

(30) Foreign Application Priority Data

Jun. 11, 2008 (JP) ................................ 2008-152534

(51) Int. Cl.
*B60W 10/04* (2006.01)
*F02D 11/10* (2006.01)

(52) U.S. Cl. ......... 477/111; 477/110; 477/906; 123/396

(58) Field of Classification Search .................. 477/107, 477/110, 111, 906; 123/339.15, 351, 376, 123/377, 396, 399
See application file for complete search history.

(56) References Cited

U.S. PATENT DOCUMENTS

| | | | | |
|---|---|---|---|---|
| 5,078,109 A | * | 1/1992 | Yoshida et al. | 123/350 |
| 5,514,049 A | * | 5/1996 | Kamio et al. | 477/111 |
| 5,927,250 A | * | 7/1999 | Nishida | 123/399 |
| 6,047,679 A | * | 4/2000 | Matsumoto et al. | 123/396 |
| 6,325,741 B1 | * | 12/2001 | Kawai | 477/111 |
| 6,932,743 B2 | * | 8/2005 | Zieles et al. | 477/187 |
| 7,131,321 B2 | * | 11/2006 | Okumura | 73/114.36 |
| 2003/0229440 A1 | * | 12/2003 | Tanaka et al. | 701/114 |
| 2004/0003656 A1 | * | 1/2004 | Ishiguro et al. | 73/118.1 |
| 2004/0259682 A1 | * | 12/2004 | Tabata et al. | 477/102 |
| 2007/0149353 A1 | * | 6/2007 | Tanei | 477/111 |
| 2009/0181823 A1 | * | 7/2009 | Moriya et al. | 477/111 |

FOREIGN PATENT DOCUMENTS

| | | |
|---|---|---|
| JP | 10238372 | 9/1998 |
| JP | 2003-065140 | 3/2003 |

\* cited by examiner

*Primary Examiner* — Roger Pang
(74) *Attorney, Agent, or Firm* — Alleman Hall McCoy Russell & Tuttle LLP

(57) ABSTRACT

A vehicle comprises a driving state detecting device configured to detect a driving state, a command signal output device configured to output a detected command signal indicating an engine driving power change command, an opening degree signal output device configured to output a detected opening degree signal, a valve drive device configured to drive a throttle valve; and a controller which is configured to set a target opening degree of the throttle valve based on the detected command signal and to control the valve drive device to cause an opening degree to match the target opening degree. The controller is configured to set, according to the driving state, the target opening degree to a smaller value than when the command signal and the opening degree signal are normal, when at least one of the command signal and the opening degree signal is abnormal.

12 Claims, 6 Drawing Sheets

|  | NORMAL | ONE TRANSMISSION PATH ABNORMAL | | | TWO TRANSMISSION PATH ABNORMAL | | |
|---|---|---|---|---|---|---|---|
|  | STATUS 1 | STATUS 2 | STATUS 3 | STATUS 4 | STATUS 5 | STATUS 6 | STATUS 7 |
| COMMAND SIGNAL OUTPUT DEVICE | ○ | △ | ○ | △ | × | ○/△ | × |
| OPENING DEGREE SIGNAL OUTPUT DEVICE | ○ | ○ | △ | △ | ○/△ | × | × |

○ : 2 TWO TRANSMISSION PATH NORMAL    △ : 1 ONLY ONE TRANSMISSION PATH ABNORMAL    × : 2 TWO TRANSMISSION PATH ABNORMAL

Fig. 3

VEHICLE AND CONTROLLER THEREOF

CROSS-REFERENCE TO RELATED PATENT APPLICATION

The application claims priority to and the benefit of Japanese Patent Application No. 2008-152534, filed Jun. 11, 2008, the entire disclosure of which is incorporated herein by reference.

BACKGROUND

The present invention relates to a vehicle including a throttle valve configured to operate to attain an opening degree according to a command for changing an engine driving power, and a controller thereof.

Conventionally, there is known a motorcycle including a controller which is configured to detect an operation amount of a throttle grip and to control a throttle valve so that the throttle valve operates to attain a target opening degree according to a detection value of the operation amount. In accordance with the controller, the throttle valve operates in accordance with a driving power change command given by a driver's operation of the throttle grip, maintaining the amount of intake-air supplied to an engine.

As such a controller, for example, Japanese Laid-Open Patent Application Publication No. 2003-65140 discloses a controller which is configured to set a target opening degree to an idling opening degree corresponding to an idling engine speed and to close a throttle valve, irrespective of the amount of a driver's operation of the grip in a case where some failure occurs.

However, the controller is configured to fix the opening degree of the throttle valve to the idling opening degree after occurrence of the failure, and as a result, the engine driving power is not changed even though the driver operates the grip, making the driver feel discomfort. Under this circumstance, the controller would be desirably configured to control driving according to the driver's demand even when the failure occurs.

SUMMARY OF THE INVENTION

A vehicle of the present invention comprises a driving state detecting device configured to detect a driving state of the vehicle; a command signal output device configured to output a detected command signal indicating an engine driving power change command given by a driver; an opening degree signal output device configured to output a detected opening degree signal indicating an opening degree of a throttle valve; a valve drive device configured to drive the throttle valve to control an opening degree of the throttle valve; and a controller which is configured to set a target opening degree of the throttle valve based on the detected command signal and to control the valve drive device to cause the opening degree indicated by the detected opening degree signal to match the target opening degree; wherein the controller is configured to set, according to the driving state detected by the driving state detecting device, the target opening degree of the throttle valve to a smaller value than when it is detected that the detected command signal and the detected opening degree signal are normal, when it is determined that at least one of the detected command signal and the detected opening degree signal is abnormal.

In accordance with such a configuration, the controller is configured to set, according to the driving state, the target opening degree of the throttle valve to a smaller value than in the normal state at the occurrence of abnormality. This can effectively suppress an increase in the driving speed at the occurrence of abnormality as compared to the normal state. In addition, conveniently, it is possible to restrict the engine driving power to different values according to the driving state. Therefore, even when abnormality occurs in the signal required to control the throttle valve, the engine driving power can be reduced, and the driving control according to the driving state can be executed.

The above and further objects and features of the invention will more fully be apparent from the following detailed description with accompanying drawings.

BRIEF DESCRIPTION OF THE DRAWINGS

FIG. 3 is a view showing statuses of a command signal output device and statuses of an opening degree signal output device of FIG. 2.

DETAILED DESCRIPTION OF THE PREFERRED EMBODIMENTS

Hereinafter, an embodiment of the present invention will be described with reference to the accompanying drawings. By way of example, a motorcycle will be described. As used herein, the directions are referenced from the perspective of a driver mounting the motorcycle.

Figure 1:
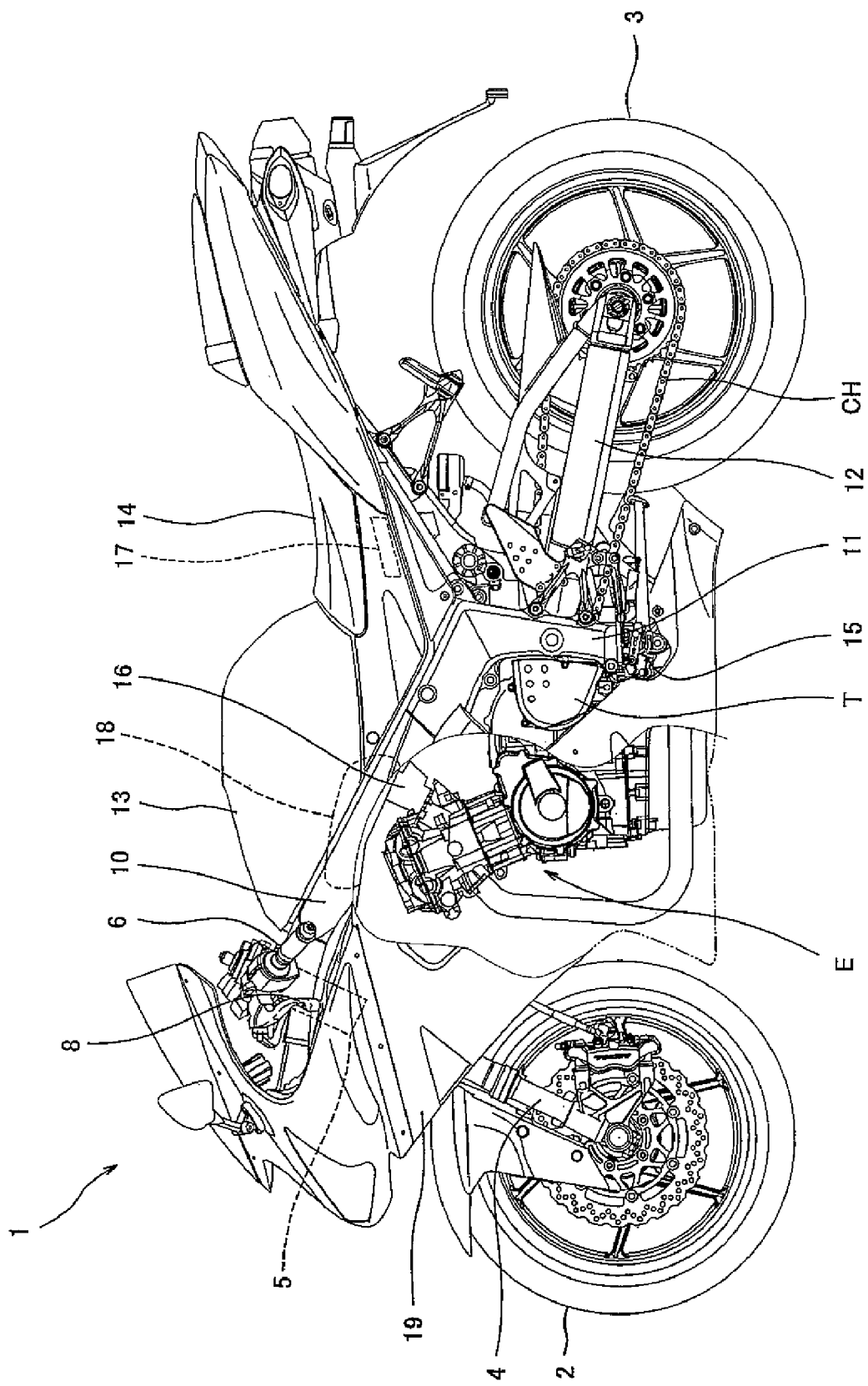
FIG. 1 is a left side view of a motorcycle which is an example of a vehicle of the present invention.

Turning to FIG. 1, a motorcycle 1 includes a front wheel 2 and a rear wheel 3. The front wheel 2 is rotatably attached to a front fork 4 extending substantially vertically. The front fork 4 is mounted to a steering shaft (not shown) by an upper bracket (not shown) provided at an upper end portion thereof and an under bracket (not shown) provided under the upper bracket. The steering shaft is rotatably mounted by a head pipe 5. A bar-type steering hand 6 extending rightward and leftward is attached to the upper bracket. The driver rotates the handle 6 to turn the front wheel 2 in a desired direction around the steering shaft which is a rotational axis.

The grip of the handle 6 which is gripped by the driver's right hand is a throttle grip which is an input member 7 (see FIG. 2) which is rotated by a force applied by the driver's wrist to control a driving power of an engine E. A clutch lever 8 is disposed in front of the grip of the handle 6 which is gripped by the driver's left hand.

A pair of right and left main frame members 10 extend from the head pipe 5 such that the frame members 10 are tilted slightly downward and rearward. A pair of right and left pivot frame members 11 are respectively coupled to rear portions of the main frame members 10. A swing arm 12 extending substantially in the longitudinal direction of the motorcycle 1 is pivotally mounted at a front end portion thereof to each pivot frame member 11. The rear wheel 3 which is a drive wheel is rotatably mounted to the rear end portions of the swing arms 12. A fuel tank 13 is disposed behind the handle 6. A straddle-type seat 14 which is straddled by the driver is disposed behind the fuel tank 13. A shift pedal 15 is provided at a position on which the left foot of the driver mounting the seat 14 rests, to shift a transmission gear position.

The engine E is mounted to the main frame members 10 and the pivot frame members 11 between the front wheel 2 and the rear wheel 3. A transmission T is coupled to the engine E. A driving power output from the transmission T is transmitted to the rear wheel 3 via a chain CH.

A throttle body 16 is disposed inside the main frame members 11 and is coupled to an intake port (not shown) of the engine E. An electronic controller (hereinafter referred to as ECU) 17 is accommodated in an inner space below the seat 14 and is configured to control a throttle valve 21 (see FIG. 2) inside the throttle body 16. An air cleaner box 18 is disposed below the fuel tank 13 and is coupled to an upstream portion of the throttle body 16 in an intake-air flow direction. The air cleaner box 18 is configured to take in air from outside utilizing a wind pressure from forward. A cowling 19 is provided to extend from a front part of a vehicle body to both side portions of the vehicle body so as to cover the engine E, and other components.

Figure 2:
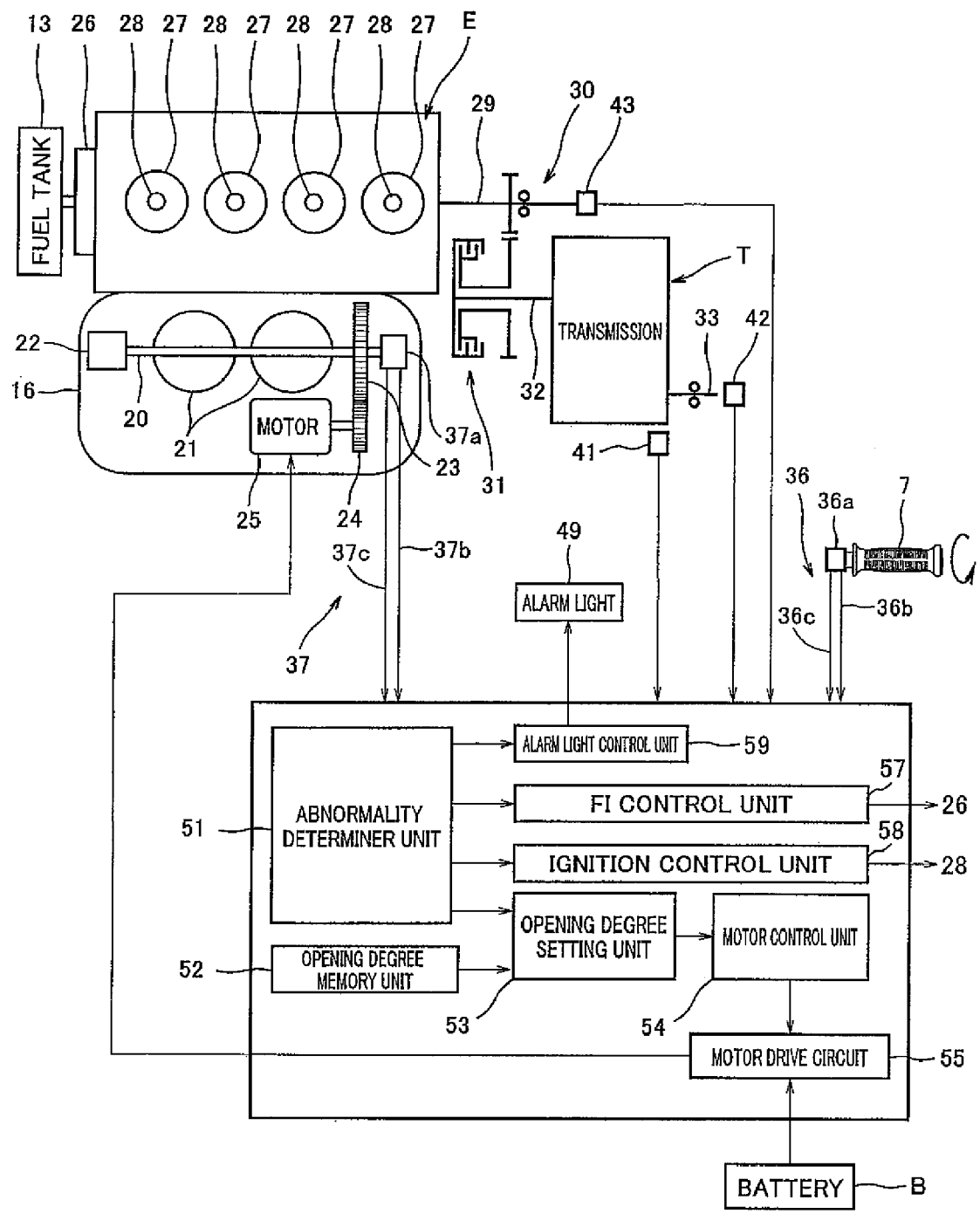
FIG. 2 is a block diagram showing a region surrounding an engine mounted in the motorcycle of FIG. 1 and a region surrounding an electronic controller according to Embodiment 1.

Turning to FIG. 2, a throttle shaft 20 is rotatably mounted to the throttle body 16 provided in the engine E. The butterfly throttle valve 21 is fixed to the throttle shaft 20. A biasing mechanism 22 is provided at a left end portion of the throttle shaft 20 to apply a force to cause the throttle shaft 20 to rotate. The opening degree (rotational angle) of the throttle valve 21 is maintained at a predetermined opening degree by the biasing mechanism 22 in the state where no external load is exerted on the throttle shaft 20.

A first gear 23 is mounted on the throttle shaft 20. The throttle body 16 has a motor 25. A second gear 24 mounted on a drive shaft of the motor 25 is in mesh with the first gear 23. In this state, the rotational driving force of the motor 25 is transmitted to the throttle shaft 20 via the first and second gears 23 and 24. The throttle shaft 20 rotates against the force applied by the biasing mechanism 22, causing the throttle valve 21 to change its opening degree. Thus, the amount of intake-air supplied to the engine E is controlled.

The air, which has passed through the throttle valve 21, is mixed with a fuel injected by a fuel injection device 26, and the resulting air-fuel mixture is supplied to a combustion chamber 27 of the engine E. The portion to which the fuel injection device 26 injects the fuel is not particularly limited. An ignition plug 28 ignites the air-fuel mixture in the interior of the combustion chamber 27 to combust it. Thereby, a piston (not shown) is driven, causing an output shaft 29 of the engine E to rotate. The driving power of the engine E is greater as the opening degree of the throttle valve 21 is larger and the amount of intake-air is larger.

The rotational driving force of the output shaft 29 is transmitted to a main shaft 32 of the transmission T via a reduction gear mechanism 30 and the clutch 31. The transmission T is a known transmission having gears which are always in mesh. The transmission T includes plural gear trains (not shown) between the main shaft 32 and a counter shaft 33 extending in parallel. In this embodiment, the transmission T has six gear trains and is configured to selectively set one of seven transmission gear positions including a neutral position and six gear positions for forward driving, according to the driver's operation of the shift pedal 15 (see FIG. 1). Among the gear positions for forward driving, the gear train corresponding to a first gear position has a highest reduction gear ratio, and the gear train corresponding to a sixth gear position has a lowest reduction gear ratio.

In the neutral position, all the gear trains are free with respect to the main shaft 32 or the counter shaft 33 so that a driving power transmission path between the shafts 32 and 33 is disconnected. By selectively fixing one of the gear trains to the shafts 32 and 33, the forward driving gear position is set. When the forward driving gear position is set, the rotational driving force of the main shaft 32 is speed-changed according to the gear ratio of the gear train corresponding to the forward driving gear position and is transmitted to the counter shaft 33. The rotational driving force is transmitted from the counter shaft 33 to the rear wheel 3 (see FIG. 1) through the chain CH (see FIG. 1) as described above, causing the rear wheel 3 to rotate. Thus, a forward propulsive force is exerted on the motorcycle (see FIG. 1).

Turning to FIG. 2, the ECU (controller) 17 is a microcomputer including CPU, a ROM, a RAM, an input/output interface, and so on. The ECU 17 includes as functional blocks, an abnormality determiner unit 51, an opening degree memory unit 52, an opening degree setting unit 53, and a motor control unit 54. The ECU 17 further includes a motor drive circuit 55 provided in an output interface. A detection signal indicating a driving state of the motorcycle 1, or the like is input to an input interface of the ECU 17.

The motorcycle 1 is provided with a command signal output device 36 and an opening degree signal output device 37. The command signal output device 36 includes a grip position sensor 36a attached to the rotational shaft of the input member 7 and two transmission paths 36b and 36c. The grip position sensor 36a is configured to detect the rotational position of the input member 7, i.e., the operation amount of the input member 7 indicating a driving power change command given by the driver. The grip position sensor 36a is configured to send a detected command signal to the ECU 17 via the transmission paths 36b and 36c. The opening degree signal output device 37 includes a throttle position sensor 37a attached on the end portion of the throttle shaft 20 and two transmission paths 37b and 37c. The throttle position sensor 37a is configured to detect the rotational position of the throttle valve 21, i.e., an actual opening degree of the throttle valve 21. The throttle position sensor 37a is configured to send an detected opening degree signal to the ECU 17 through the transmission paths 37b and 37c.

The motorcycle 1 is provided with a gear position sensor (gear position detecting device) 41 configured to detect a gear position set in the transmission T, a speed sensor (speed associated value detecting device) 42 configured to detect a driving speed, an engine speed sensor (speed associated value detecting device) 43 configured to detect an engine speed of the engine E, and so on, in order to detect the driving state of the motorcycle 1 and the operating state of the motorcycle 1. The signals output from the sensors 41 to 43 are input to the ECU 17.

The abnormality determiner unit 51 is configured to determine whether or not there is abnormality in the ECU 17, and the sensors 36a, 37a and 41 to 43. For example, the abnormality determiner unit 51 is configured to determine whether the signals output from the command signal output device 36 and the signals output from the opening degree signal output device 37 are normal or abnormal based on whether or not the voltage values of these signals fall within a predetermined range. This determination is made for each of the transmission paths 36b and 36c of the command signal output device 36 and the transmission paths 37b and 37c of the opening degree signal output device 37.

The abnormality determiner unit 51 determines the status of the command signal output device 36 and the status of the opening degree signal output device 37 as "normal," "one transmission path abnormal," or "two transmission paths abnormal" (see FIG. 3).

The "normal" indicates that the two transmission paths 36b and 36c of the command signal output device 36 and the two transmission paths 37b and 37c of the opening degree signal output device 37 are normal (see "status 1" in FIG. 3). In this status, a normal detected command signal and a normal detected opening degree signal are input to the ECU 17 through the two system transmission paths, 36b, 36c, and 37b, and 37c.

The "one transmission path abnormal" indicates that the one transmission path of the command signal output device 36 is abnormal and the two transmission paths of the opening degree signal output device 37 are normal (see "status 2" in FIG. 3), the one transmission path of the opening degree signal output device 37 is abnormal and the two transmission paths of the command signal output device 36 are normal (see "status 3" in FIG. 3), or the one transmission path of the command signal output device 36 and the one transmission path of the opening degree signal output device 37 are abnormal (see "status 4" in FIG. 3). In this status, the normal detected command signal and the normal detected opening degree signal are input to the ECU 17 through at least one transmission path.

The "two transmission paths abnormal" indicates that the two transmission paths of at least either the command signal output device 36 or the opening degree signal output device 37 are abnormal (see "statuses 5 to 7" in FIG. 3). In this status, the normal detected command signal or the normal detected opening degree signal is not input to the ECU 17. Therefore, the ECU 17 is unable to detect the driving power change command given by the driver or the actual opening degree of the throttle valve 21.

The opening degree setting unit 53 is configured to set the target opening degree of the throttle valve 21 according to the statuses of the signal output devices 36 and 37, the driving power change command given by the driver, or the like, with reference to the maps stored in the opening degree memory unit 52 as described later. The motor control unit 54 is configured to output a control signal to the motor drive circuit 55 based on the target opening degree set by the opening degree setting unit 53. The motor drive circuit 55 is configured to rotate the motor 25 (valve drive device) to rotate normally and reversely. The motor drive circuit 55 supplies to the motor 25 a drive voltage from a battery B built into the vehicle body in accordance with the control signal from the motor control unit 54. When the motor 25 rotates in response to the drive voltage, the throttle shaft 20 rotates so that the actual opening degree of the throttle valve 21 reaches the target opening degree. The motor 25 is caused to operate based on the detected opening degree signal from the opening degree signal output device 37. The throttle valve 21 operates so that the actual opening degree of the throttle valve 21 reaches the target opening degree set in step S12.

The ECU 17 further includes a FI control unit 57 configured to output a signal to the fuel injection device 26 to control a fuel injection amount and a fuel injection timing, and an ignition control unit 58 configured to output a signal to an ignition plug 28 to control an operation timing of the ignition plug 28, based on the operating state or the like detected by the sensors. The control units 57 and 58 are configured to execute control according to determination as to abnormality which is executed by the abnormality determiner unit 51.

An alarm light 49 is disposed adjacent meters and gauges in the vicinity of the handle 6 (see FIG. 1). The ECU 17 includes an alarm light control unit 59 for turning ON the alarm light 49 if the abnormality determiner unit 51 determines that abnormality has occurred.

Hereinafter, the driving control which is executed by the ECU 17 will be described with reference to FIG. 2 and the flowchart of FIG. 4. The process according to the flowchart is repeated at specified time intervals after an initialization process performed when an electric power supply of the motorcycle 1 is turned ON.

Initially, the abnormality determiner unit 51 determines whether or not there is abnormality in the command signal output device 36 and the opening degree signal output device 37 (step S1). According to the determination, it is determined that command signal output device 36 and the opening degree signal output device 37 is in one of the three statuses (see FIG. 3) (step S2). The step S2 is not limited to the illustrated procedure (step S2a, Step S2b) so long as it can transition to a mode S10, a mode S20, or a mode S30 according to each status.

Normal mode

If it is determined that the status is normal in step S2a, the process transitions to the normal mode S10. In the normal mode S10, first, the operation amount of the input member 7 is detected based on the normal detected command signal output from the command signal output device 36 (step S11), and the opening degree setting unit 53 sets the target opening degree with reference to the map stored in the opening degree memory unit 52 (step S12).

Figure 5A:
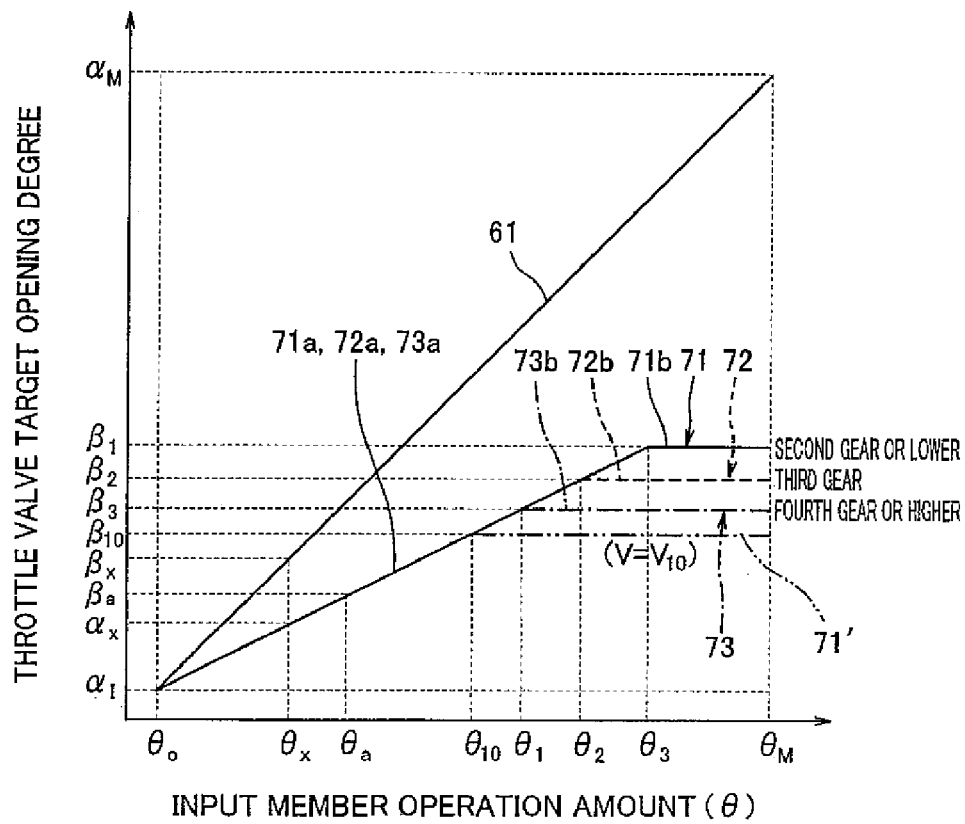
FIG. 5A is a view of maps which are stored in an opening degree memory unit of FIG. 2, using the operation amount of an input member as a parameter.

FIG. 5A shows a normal map 61 which is referenced to in the normal mode S10. As can be seen from the normal map 61, the target opening degree is set to an idling opening degree αI (about one degree) when the operation amount θ of the input member 7 is a minimum amount θ0, while the target opening degree is set to a full open opening degree αM (about 90 degrees) when the operation amount θ of the input member 7 is a maximum amount θM. Thus, the target opening degree is set to a larger value when the operation amount θ is larger. As used herein, the idling opening degree αI refers to an opening degree of the throttle valve 21 set so that the engine speed reaches a predetermined idling engine speed, and the throttle valve 21 corresponding to the idling opening degree αI is in a substantially fully closed position. In this embodiment, the target opening degree changes linearly according to a change in the operation amount θ of the input member 7.

Turning to FIG. 4 again, the motor control unit 54 outputs the control signal based on the target opening degree set according to the operation amount of the input member 7 with reference to the map. Based on the control signal, the motor drive circuit 55 supplies the drive voltage to the motor 25, causing the motor 25 to rotate (step S13). When the motor 25 rotates, the throttle valve 21 operates so that the actual opening degree of the throttle valve 21 reaches the target opening degree set in step S12, based on the normal detected opening degree signal output from the opening degree signal output device 37.

In the manner described above, in the "normal" status, the driving control is executed in accordance with the driving power change command given by the driver based on the normal detected command signal output via the two transmission paths 36b and 36c.

Limp Home Mode

If it is determined that the status is not "normal" in step S2a and it is determined that the status is "two transmission paths abnormal" in step S2b, the process transitions to a limp home mode S20. In the limp home mode S20, the target opening degree is set to a predetermined small opening degree (e.g., idling opening degree or a predetermined opening degree maintained by the biasing mechanism 22), irrespective of the operation amount of the input member 7, for example. This enables the motorcycle 1 to drive forward at a low speed even if the ECU 17 cannot detect the driving power change command or the actual opening degree. The alarm light 49 is turned ON to inform the driver that abnormality has occurred, when the process transitions to the limp home mode S20 (step S21).

Driving Power Restriction Mode If it is determined that the status is "one transmission path abnormal" in step S2b, the process transitions to a driving power restriction mode S30. In the driving power restriction mode S30, first, the alarm light control unit 59 is activated to turn ON the alarm light 49 (step S31), and the operation amount of the input member 7, the gear position and the driving speed are detected (step S32). The operation amount of the input member 7 is detected based on a normal detected command signal sent to the ECU 17 through a transmission path of the command signal output device 36 for which no abnormality has been detected. The transmission gear position is detected based on the signal output from the gear position sensor 41. The driving speed is detected based on the signal output from the speed sensor 42.

Then, the opening degree setting unit 53 selects one of a plurality of (three in this embodiment) three-dimensional maps using as parameters the operation amount of the input member 7 and the driving speed, according to the transmission gear position, and sets the target opening degree with reference to the selected map (step S33).

Figure 5B:
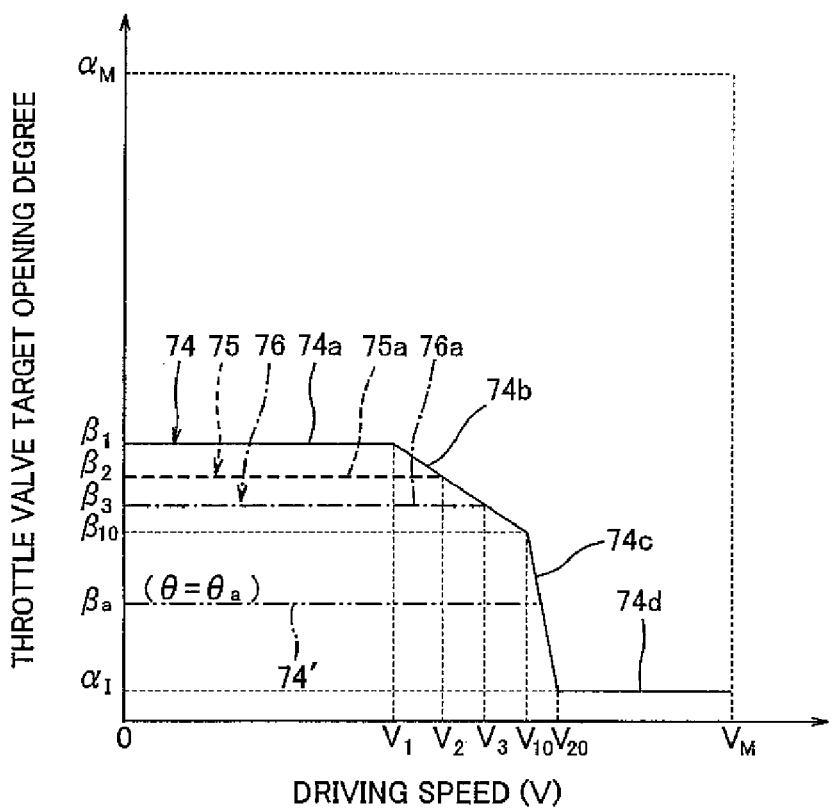
FIG. 5B is a view of maps which are stored in the opening degree memory unit of FIG. 2, using a driving speed as a parameter.

FIG. 5A shows three two-dimensional operation amount maps 71 to 73 using as parameters the operation amount θ of the input member 7 with the driving speed V being fixed to zero. FIG. 5B shows three two-dimensional vehicle speed maps 74 to 76 using as parameters the driving speed V with the operation amount θ of the input member 7 being fixed to zero. Among these maps, the low-speed operation amount map 71 and the low-speed vehicle speed map 74 are selected when the transmission T is the first gear position and the second gear position, the medium-speed operation amount map 72 and the medium-speed vehicle speed map 75 are selected when the transmission T is in the third gear position, and the high-speed operation amount map 73 and the high-speed vehicle speed map 76 are selected when the transmission T is in the fourth gear position to the sixth gear position. Although not specifically limited, for example, the low-speed operation amount map 71 and the low-speed vehicle speed map 74 are selected when the transmission T is in the neutral position.

In accordance with the operation amount maps 71 to 73 shown in FIG. 5A, the target opening degree is set to the idling opening degree αI when the operation amount θ of the input member 7 is the minimum amount θ0. The target opening degree increases in proportion to the operation amount θ until the target opening degree reaches a predetermined upper limit opening degree β1, β2, or β3 which is defined by each map (see increase/decrease range 71a, 72a, 73a). In this embodiment, as the operation amount θ increases, the target opening degree changes linearly according to the operation amount θ which is between the minimum amount θ0 and the first to third threshold θ1, θ2, or θ3 respectively corresponding to the upper limit opening degrees β3, β2, or β1. When the operation amount θ exceeds the threshold θ1, θ2, or θ3, the target opening degree is set to the upper limit opening degree β3, β2, or β1, irrespective of the operation amount θ (see horizontal range 71b, 72b, 73b).

When the increase/decrease ranges 71a to 73a in the operation amount maps 71 to 73 are compared to the normal map 61, a change in the target opening degree with respect to a change in the operation amount θ is smaller than in the normal map 61, in the driving power restriction mode in the increase/decrease ranges 71a to 73a of the operation amount maps 71 to 73. To be specific, the inclination of the increase/decrease ranges 71a to 73a is 0.3 to 0.5 times as large as that of the normal map 61. In other words, a target opening degree βx set according to an operation amount θx is restricted to an opening degree (βx=A·αx) which is obtained by multiplying an opening degree αx set in the normal mode by a predetermined decrease rate A (A is smaller than 1 and 0.3 to 0.5, for example). In this embodiment, the increase/decrease ranges 71a to 73a conform to each other, and the decrease rates corresponding to the respective transmission gear positions are equal.

The first upper limit opening degree β1 defined by the low-speed operation amount map 71 is smaller than the full open opening degree αM (e.g., about 40% of the full open opening degree αM). The second upper limit opening degree β2 defined by the medium-speed operation amount map 72 is smaller than the first upper limit opening degree β1 (e.g., about 35% of the full open opening degree αM). The third upper limit opening degree β3 defined by the low-speed operation amount map 73 is smaller than the second upper limit opening degree β2 (e.g., about 30% of the full open opening degree αM).

In accordance with the vehicle speed maps 74 to 76 shown in FIG. 5B, the target opening degree is set to the opening degree (herein, upper limit opening degree β1, β2, or β3) according to the operation amount (herein maximum amount θM) when the vehicle speed V is zero.

With reference to the low-speed vehicle speed map 74, the target opening degree is set to the opening degree β1 irrespective of the driving speed, until the driving speed V reaches a first restriction start speed V1 (see horizontal range 74a). The target opening degree is restricted to gradually decrease as the driving speed V increases in a period from when the driving speed V exceeds the first restriction start speed V1 until it reaches a predetermined restricted speed V10 (see first restriction range 74b). When the driving speed V is equal to the restricted speed V10, the target opening degree is set to a predetermined restricted opening degree β10. The target opening degree is restricted to gradually decrease as the driving speed V increases in a period from when the driving speed V exceeds the restricted speed V10 until it reaches a predetermined restricted idling speed V20 (see second restriction range 74c). When the driving speed V is the restricted idling speed V20, the target opening degree is set to the idling opening degree αI. When the driving speed V exceeds the restricted idling speed V20, the target opening degree is set to the idling opening degree αI irrespective of the driving speed V (see third restriction range 74d). That is, the target opening degree is set so that the engine speed is the idling engine speed. In this embodiment, the target opening degree linearly decreases according to an increase in the driving speed V, and the inclination of the second restriction range 74c is larger than the inclination of the first restriction range 74b with reference to the first and second restriction ranges 74b and 74c.

The vehicle speed maps 75 and 76 show similar trends. The target opening degree is set to the opening degree β2 or β3 determined according to the operation amount θM irrespective of the driving speed V, in a period from when the driving speed V is zero until it reaches the corresponding restriction start speed V2 or V3 (see horizontal ranges 75a and 76a). The restriction start speeds V2 and V3 are present on the first restriction range 74b of the low-speed vehicle speed map 74. When the vehicle speed V exceeds the restriction start speed V2 and V3, the maps 75 and 76 conforms to the low-speed vehicle speed map 74, and the target opening degree is set according to the driving speed V in the manner as described above. Thus, when the driving speed V exceeds the restriction start speed V1, V2, or V3, the target opening degree is set smaller according to the driving speed which has exceeded, irrespective of the reduction gear ratio. As can be seen from FIG. 5B, in this embodiment, the first restriction start speed V1 corresponding to the transmission gear position being in a low-speed range is lower than the second restriction start speed V2 corresponding to the gear position being in a medium-speed range and the third restriction start speed V3 corresponding to the transmission gear position being in an high-speed range.

In FIG. 5B, two-dotted line indicates a low-speed vehicle speed map 74' in a case where the operation amount θ of the input member 7 is a certain operation amount θa (see FIG. 5A). Herein, the operation amount θa is set smaller than an operation amount θ10 for setting the target opening degree to the restricted opening degree β10. According to the vehicle speed map 74', the target opening degree is set to the opening degree βa determined according to the operation amount θa in the period from when the driving speed V is zero until it reaches the restriction start speed. The restriction start speed is present on the second restriction range 74c. When the driving speed V exceeds the restriction start speed, the vehicle speed map 74' conforms to the low-speed vehicle speed map 74 indicated by a solid line, and the target opening degree is set according to the driving speed in the same manner as described above. As should be understood, the restriction start speed may have different values depending on the associated operation amount or transmission gear position.

FIG. 5A shows a low-speed operation amount map 71' in a case where the driving speed V is equal to the restricted speed V10. As can be seen from the operation amount map 71', the target opening degree increases along the increase/decrease range 71a of the operation amount map 71 indicated by the solid line in a period in which the operation amount θ increases from the minimum amount θ0 to the operation amount θ10. When the operation amount θ exceeds the operation amount θ10, the target opening degree is set to the restricted opening degree β10 irrespective of the operation amount.

Turning to FIG. 4 again, the motor control unit 54 outputs a control signal based on the target opening degree set according to the operation amount and the driving speed with reference to the map selected according to the transmission gear position. Based on the control signal output from the motor control unit 54, the motor drive circuit 55 supplies the drive voltage to the motor 25, causing the motor 25 to rotate (step S34). The motor 25 rotates to cause the throttle valve 21 to operate so that its actual opening degree reaches the target opening degree set in sep S33 based on a normal detected opening degree signal input to the ECU 17 via a transmission path of the opening degree signal output device 37 which has been determined as normal.

As should be understood from above, each of the command signal output device 36 and the opening degree signal detecting device 37 has two transmission paths, and is capable of, if abnormality has occurred in one of the transmission paths, outputting the normal detection signal using the other transmission path. This enables the ECU 17 to control the operation of the throttle valve 21 in accordance with the driving power change command given by the driver, even when the abnormality occurs in the command signal output device 36 and the opening degree signal detecting device 37.

Subsequently, the operation associated with driving in the driving power restriction mode will be described with reference to FIG. 2, 5A or 5B. Since the target opening degree set according to the operation amount of the input member 7 is restricted to the opening degree smaller than the opening degree in the normal mode(see normal map 61 and increase/decrease ranges 71a, 72a, and 73a), the driving speed can be changed according to the command given by the driver, and the driving power of the engine E is restricted to suppress an excess increase in the driving speed.

The upper limit values β1, β2, and β3 of the target opening degree are different according to the transmission gear position. The driving power of the engine E is restricted according to the transmission gear position (see horizontal ranges 71b, 72b, and 73b, etc). Since the upper limit opening degree is smaller in a higher transmission gear position, the engine driving power of the engine E is restricted with a greater degree when the transmission T is set in a higher gear position. Therefore, it is possible to suppress an excess increase in a driving speed even when the operation amount of the input member 7 is large when the transmission T is set in a higher gear position.

It should be noted that the target opening degree is set according to the operation amount as described above when the driving speed V is not higher than the restriction start speed V1, V2, or V3 (see horizontal range 74a, 75a, and 76a). Thus, the driving speed can be changed according to the driving power change command given by the driver during low-speed driving. As a result, the accelerated driving is achieved without degrading the driver's feeling when the engine is starting, for example.

When the vehicle speed exceeds the restriction start speed V1, V2, or V3, the target opening degree is further restricted according to the driving speed which has exceeded (see first to third restriction ranges 74b, 74c, and 74d). For this reason, when it is detected that the driving speed V is higher than the restricted speed V10, because the motorcycle 1 is driving on a downward slope, for example, it is possible to suppress an excess increase in the driving speed V.

The target opening degree may be restricted to the idling opening degree αI with an increase in the driving speed V. The restriction amount of the target opening degree according to an increase in a unit speed is larger in a speed range between the restricted speed V10 and the restricted idling speed V20 than in a speed range between the restriction start speed V1, V2, or V3 and the restricted speed V10 (see first and second restriction ranges 74b and 74c). Thus, the engine driving power is significantly decreased when the driving speed exceeds the restricted speed V10, and therefore it is possible to effectively suppress an event that the vehicle speed V rises beyond the restricted speed V10. In other words, it is possible to set the upper limit of the driving speed to a value close to the predetermined restricted speed V10. The driving power of the engine E is gradually decreased when the driving speed V exceeds the restriction start speed V1, V2, or V3 which is lower than the restricted speed V10. Therefore, a deceleration shock in a state where the driving speed V is close to the speed V10 can be lessened, by restricting the driving power with a great degree to suppress the upper limit of the driving speed V to a value close to the restricted speed V10, when it is detected that the driving speed V is higher than the restricted speed V10.

The alarm light 49 is turned ON to inform the driver that abnormality has occurred. To enable the driver to distinguish between "one transmission path abnormal" or "two transmission paths abnormal," the alarm light control unit 59 may operate to cause the alarm light 49 to turn ON in different fashions in the limp home mode and in the driving power restriction mode.

In the driving power restriction mode, to assist restriction of the driving power of the engine E, the FI control unit 57 may control the fuel injection device 26 to limit feeding of the fuel or the ignition control unit 58 may control the ignition plug 28 to retard the ignition timing or extinguish a flame. Such control may be executed according to a predetermined operating state such as a driving speed, and the like. For example, the above control may be executed when it is detected that the driving speed is higher than the restricted speed V10. This makes it possible to effectively suppress that the driving speed rises beyond the restricted speed V10. Whereas FIG. 2 schematically shows the engine E including four cylinders, the cylinders which are subjected to the above control are not particularly limited.

In vehicles, the engine speed is typically constant when the opening degree command of the throttle valve 21 is the same. The driving speed changes according to a change in the transmission gear position even when the engine speed is equal. That is, the driving speed is higher in the case where the reduction gear ratio is lower than in the case where the reduction gear ratio is higher even when the opening degree command given by the driver is the same. In a comparative example, to appropriately suppress the driving speed when a reduction gear ratio is low, the target opening degree corresponding to the full open opening degree command is set smaller than in the normal mode, when it is determined that abnormality has occurred. In this case, the engine driving power significantly decreases if the reduction gear ratio is high even when the full open opening degree command is given by the driver. As a result, acceleration capability in the low-speed range becomes low.

In contrast, in this embodiment, when it is determined that abnormality has occurred, a rule for finding a target opening degree based on the opening degree command signal is changed according to the driving state. To be specific, in the state where the speed is low, the target opening degree is set in such a manner that, when it is determined that abnormality has occurred, a decrease rate of the target opening degree with respect to the target opening degree in the normal state which is derived based on the opening degree command is set smaller. On the other hand, in the state where the speed is high, the target opening degree is set in such a manner that, when it is determined that abnormality has occurred, the decrease rate of the target opening degree with respect to the target opening degree in the normal state which is derived based on the opening degree command is set larger. As used herein, the state where the speed is low includes a state where the driving speed is low, a state where the reduction gear ratio in the transmission T is high, and a state where the acceleration of the vehicle is smaller than a predetermined value. The state where the speed is high includes a state where the driving speed is high, a state where the reduction gear ratio in the transmission T is low, and a state where the acceleration of the vehicle is larger than a predetermined value.

In contrast to the comparative example, with the above configuration, it is possible to reach a predetermined driving speed in a short time while preventing deficiency of the engine driving power in the low-speed state when it is determined that abnormality has occurred. Also, it is also possible to suppress an excess increase in the driving speed while preventing an excess engine driving power in the state where the speed is high when it is determined that abnormality has occurred.

Figure 6A:
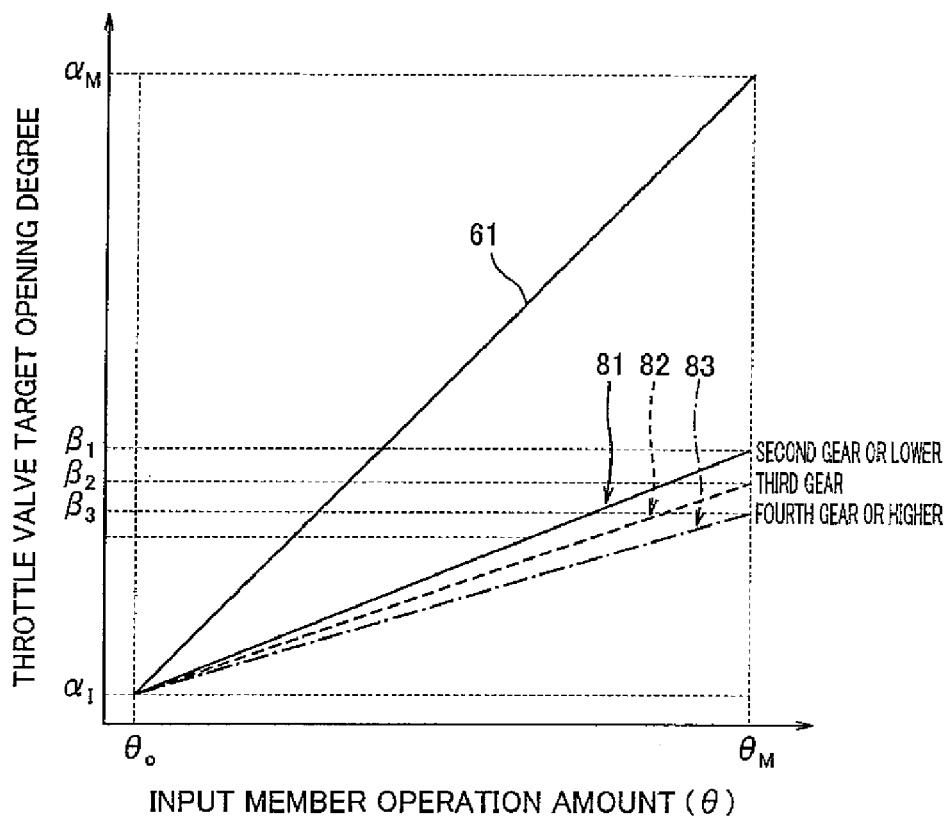
FIG. 6A is a view of maps which are stored in an opening degree memory unit included in an electronic controller according to Embodiment 2, using the operation amount of the input member as a parameter.
Figure 6B:
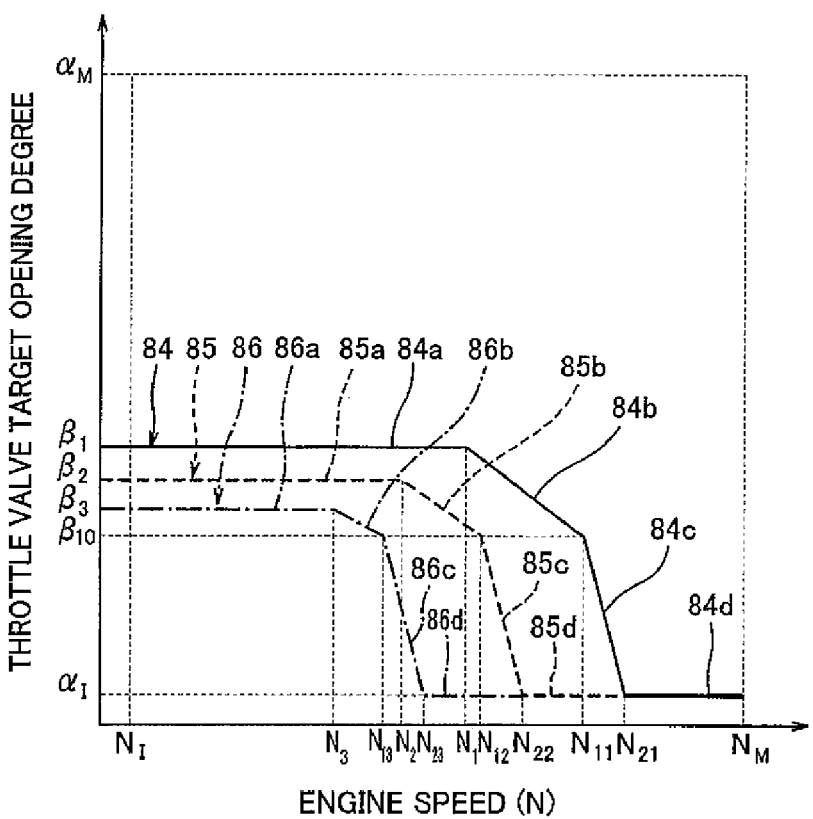
FIG. 6B is a view of maps which are stored in the opening degree memory unit included in the electronic controller according to Embodiment 2, using an engine speed of the engine as a parameter.

FIGS. 6A and 6B are views of maps stored in an opening degree memory unit of an electronic controller according to Embodiment 2. In this embodiment, the maps referenced to in the driving power restriction mode are different from those of Embodiment 1. Hereinafter, the difference will be in large part described, and the same components as those in FIG. 2 are identified by the same reference numerals and will not be described repetitively.

FIG. 6A shows three operation amount maps 81 to 83 using as parameters the operation amount θ of the input member 7 with an engine speed N being fixed to an idling engine speed NI. FIG. 6B shows three engine speed maps 84 to 86 using as parameters the engine speed N with the operation amount θ of the input member 7 being fixed to the maximum amount θM. Among these maps, the low-speed operation amount map 81 and the low-speed engine speed map 84 are selected when the transmission T is in the first gear position and the second gear position, the medium-speed operation amount map 82 and the medium-speed engine speed map 85 are selected when the transmission T is in the third gear position, and the high-speed operation amount map 83 and the high-speed engine speed map 86 are selected when the transmission T is in the fourth gear position to the sixth gear position.

In accordance with the operation amount maps 81 to 83 shown in FIG. 6A, the target opening degree is set to the idling opening degree αI when the operation amount of the input member 7 is a minimum amount θ0, while the target opening degree is set to β1, β2, or β3 (αM>β1>β2>β3) as in Embodiment 1 when the operation amount θ is a maximum amount θM. The target opening degree increases as the operation amount θ increases. In this embodiment, the target opening degree changes linearly according to a change in the operation amount θ. The decrease rate of the target opening degree with respect to the opening degree set in the normal mode according to a certain operation amount varies from map to map. To be specific, in this embodiment, the decrease rate of the high-speed operation amount map 83 is largest and the decrease rate of the low-speed operation amount map 81 is smallest. This makes it possible to avoid that the driving speed increases excessively even when the transmission T is in a higher gear position.

In accordance with the engine speed maps 81 to 83 shown in FIG. 6B, the target opening degree is set to the opening degree (in this embodiment, the upper limit opening degree β1, β2, or β3) according to the operation amount (in this embodiment maximum amount θM) when the engine speed N is in a low-speed range.

With reference to the low-speed engine speed map 74, the target opening degree is set to the opening degree β1 irrespective of the engine speed N until the engine speed N reaches a first restriction start engine speed N1 (see horizontal range 84a). The target opening degree is restricted to gradually decrease as the engine speed N increases in a period from when the engine speed N exceeds a first restriction start engine speed N1 until it reaches a predetermined restricted engine speed N11 (see first restriction range 84b). When the engine speed N is the restricted engine speed N11, the target opening degree is set to the restricted opening degree β10 as described above. The target opening degree is restricted to gradually decrease as the engine speed increases in a period from when the engine speed N exceeds the restricted engine speed N11 until it reaches a predetermined restricted idling engine speed N21 (see second restriction range 84c). When the engine speed N is the restricted idling engine speed N21, the target opening degree is set to the idling opening degree αI. When the engine speed N exceeds the restricted idling engine speed N21, the target opening degree is set to the idling opening degree α1 irrespective of the engine speed N (see third restriction range 84d). In this embodiment, the target opening degree linearly decreases according to an increase in the engine speed N, and the inclination of the second restriction range 84c is larger than the inclination of the first restriction range 84b with reference to the first and second restriction ranges 84b and 84c.

The engine speed maps 85 and 86 show similar trends. The target opening degree is set to the opening degree according to the operation amount θ irrespective of the engine speed N, until the engine speed N reaches the corresponding restriction start engine speed N2 or N3 (see horizontal range 85a, 86a). The target opening degree is restricted to gradually decrease as the engine speed increases in a period from when the engine speed N exceeds the restriction start engine speed N2 or N3 until it reaches the predetermined restricted engine speed N12 or N13 (see first restriction range 85b, 86b). The target opening degree is restricted to gradually decrease as the engine speed N increases in a period from when the engine speed N exceeds the restricted engine speed N12 or N13 until it reaches the predetermined restricted idling engine speed N22 or N23 (see second restriction range 85c, 86c). When the engine speed N exceeds the restricted idling engine speed N22 or N23, the target opening degree is set to the idling opening degree αI irrespective of the engine speed (see third restriction range 85d, 86d). When the engine speed N is equal to the restricted engine speed N12 or N13, the target opening degree is set to the restricted opening degree β10, while when the engine speed N is equal to the restricted idling engine speed N22 or N23, the target opening degree is set to the idling opening degree αI.

In this embodiment, the restricted engine speeds N11, N12, and N13 respectively corresponding to the maps 84 to 86 are different. The restricted engine speeds N11, N12, and N13 are set so that the driving speed V is substantially equal to the restricted speed V10 described in Embodiment 1 when the motorcycle 1 is driving at the engine speed N11, N12, or N13.

Figure 4:
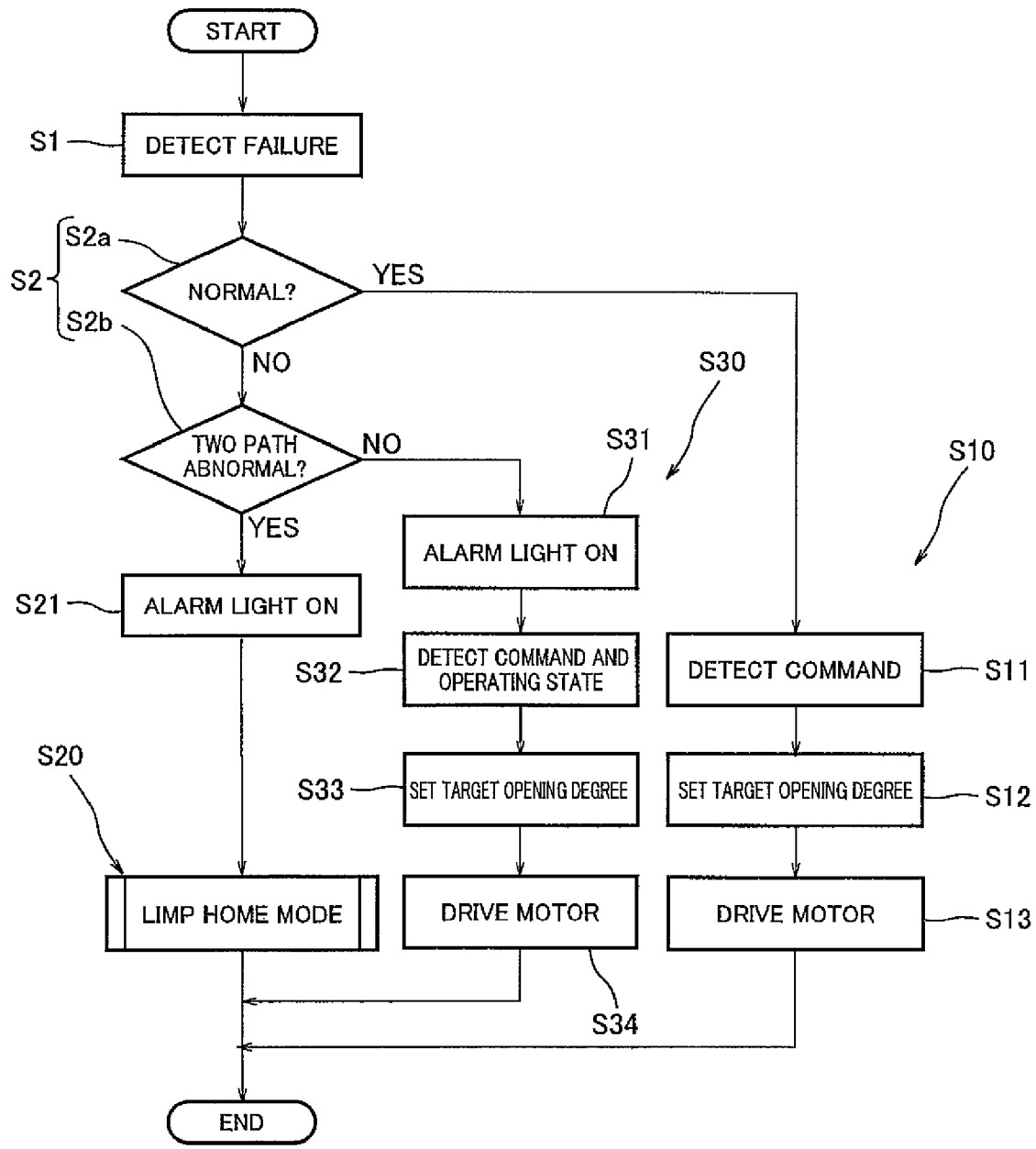
FIG. 4 is a flowchart showing a control process executed by the electronic controller of FIG. 2.

In this embodiment, if it is determined that the status is "one transmission path abnormal" in step S2 of FIG. 4, the process transitions to the driving power restriction mode S30.

In step S32, the operation amount of the input member 7, the transmission gear position and the engine speed are detected. The engine speed is detected based on the signal output from the engine speed sensor 43. In step S33, the map according to the transmission gear position is selected by the opening degree setting unit 53, and the target opening degree of the throttle valve 21 according to the operation amount of the input member 7 and the engine speed is set with reference to the selected map. In step S34, and the motor control unit 54 outputs a control signal based on the set target opening degree, the motor drive circuit 55 supplies a drive voltage to the motor 25 based on the control signal, causing the motor 25 to rotate. Thus, the throttle valve 21 operates so that the actual opening degree reaches the target opening degree set in step S33.

As should be appreciated from above, when the status is "one transmission path abnormal," driving control according to the driving power change command given by the driver is executed while restricting the driving power of the engine E, based on the normal command signal output from at least one of the transmission paths 36b and 36c. Furthermore, proper driving control is executed to inhibit an excess increase in the driving speed, according to the operating state such as the engine speed or the transmission gear position. Moreover, in this embodiment, also, the fuel cut control, the flame extinguishment control, or the ignition retard angle control may be carried out in the predetermined operating state.

The above embodiments may be altered without departing the scope of the present invention. For example, the trends of the maps are merely exemplary and may be suitably changed within the scope of the present invention. In a case where the engine driving power in a transmission gear position with a high reduction gear ratio is set to a significantly large value, the decrease rate of the opening degree in the transmission gear position with the high reduction gear ratio may be set smaller than the decrease rate of the opening degree in a transmission gear position with a low reduction gear ratio. This makes it possible to avoid rapid acceleration in the low-speed state under the abnormal state.

At least two maps will suffice as the maps selected according to the transmission gear position. The map may be provided for each transmission gear position. As the parameter for setting the target opening degree in the driving power restriction mode, the driving speed and the engine speed may be used at the same time.

To calculate the decrease rate A of the target opening degree set at the occurrence of the abnormality with respect to the target opening degree in the normal state, a data base map containing the target opening degree, the transmission gear position and the throttle valve opening degree such that they correlate with each other may be used. A formula for calculating the target opening degree may be a function using the transmission gear position and the throttle valve opening degree as variables. Having described in this embodiment, the target opening degree is determined based on the driving state consisting of the transmission gear position and the driving speed, or the driving state consisting of the transmission gear position and the engine speed, when it is determined that abnormality has occurred, it may be determined based on one of the transmission gear position and the driving speed, or the one of the transmission gear position and the engine speed.

Having described an example in which the target opening degree of the throttle valve is set according to the transmission gear position and the driving speed when it is determined that abnormality has occurred, it may be set according to other driving states. The driving state includes a fuel amount, a battery amount, an oil temperature, a cooling water temperature, etc, which can be detected or determined by the ECU 17. In further alternative, the driving state includes a driving mode which can be set by the ECU. The driving mode includes a cruise control mode, a low fuel consumption mode (ecology mode), an acceleration mode, a high driving power mode, an ABS operation mode, a traction control mode, etc. When it is determined that some abnormality has occurred in these modes, the control for setting the target opening degree of the throttle valve to a smaller value than when it is determined that these modes are normal, may be carried out.

Instead of the transmission in which the gears are always in mesh, the transmission T may be another suitable multi-stage transmission, or a continuously variable transmission (CVT). As the input member 7, an accelerator pedal or the like may be suitably used according to the type of the vehicle.

The vehicle of the present invention is not limited to the motorcycle, but may be other straddle vehicles such as an off road vehicle. The present invention is applicable to vehicles including a transmission and an electronically controlled throttle valve.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle comprising:
a transmission gear position detecting device configured to detect a gear position of a transmission;
a command signal output device configured to output a detected command signal indicating an engine driving power change command given by a driver;
an opening degree signal output device configured to output a detected opening degree signal indicating an opening degree of a throttle valve;
a valve drive device configured to drive the throttle valve to control the opening degree of the throttle valve; and
a controller which is configured to set a target opening degree of the throttle valve based on the detected command signal and to control the valve drive device to cause the opening degree indicated by the detected opening degree signal to match the target opening degree;
wherein the controller is configured to set, according to the gear position detected by the transmission gear position detecting device, the target opening degree of the throttle valve to a smaller value than when it is determined that the detected command signal and the detected opening degree signal are normal, when it is determined that at least one of the detected command signal and the detected opening degree signal is abnormal.

2. The vehicle according to claim 1, wherein the command signal output device or the opening degree signal output device is configured to output plural signals to the controller;
wherein the controller is configured to, when it is determined that one of the plural signals is abnormal, control the valve drive device based on another signal which is determined as normal.

3. The vehicle according to claim 2,
wherein the controller is configured to set, according to the gear position, an upper limit value of the target opening degree set according to the detected command signal when it is determined that at least one of the detected command signal and the detected opening degree signal is abnormal; and
wherein an upper limit value of the target opening degree in a gear position is smaller than an upper limit value of the target opening degree in another gear position having a reduction gear ratio higher than a reduction gear ratio of the gear position.

4. The vehicle according to claim 2,
wherein the controller is configured to set the target opening degree in such a manner that the target opening degree set according to the detected command signal in a case where it is determined that the detected command signal and the detected opening degree signal are normal is decreased according to a predetermined decrease rate, when it is determined that at least one of the detected command signal and the detected opening degree signal is abnormal; and
wherein a decrease rate of the target opening degree in a gear position is smaller than a decrease rate of the target opening degree in another gear position having a reduction gear ratio higher than a reduction gear ratio of the gear position.

5. The vehicle according to claim 4,
wherein the controller is configured to set, according to the gear position, an upper limit value of the target opening degree set according to the detected command signal, when it is determined that at least one of the detected command signal and the detected opening degree signal is abnormal; and
wherein an upper limit value of the target opening degree in a gear position is smaller than an upper limit value of the target opening degree in another gear position having a reduction gear ratio higher than a reduction gear ratio of the gear position.

6. The vehicle according to claim 1, further comprising:
a speed associated value detecting device configured to detect a driving speed or an engine speed of an engine;
wherein the controller is configured to, when the driving speed or the engine speed which is detected by the speed associated value detecting device exceeds a predetermined restricted opening degree threshold, set the target opening degree of the throttle valve to a smaller value than prior to exceeding the predetermined restricted opening degree threshold.

7. The vehicle according to claim 6,
wherein the controller is configured to set the predetermined restricted opening degree threshold according to the gear position of the transmission.

8. A vehicle comprising:
a speed associated value detecting device configured to detect a driving speed or an engine speed of an engine;
a command signal output device configured to output a detected command signal indicating an engine driving power change command given by a driver;
an opening degree signal output device configured to output a detected opening degree signal indicating an opening degree of a throttle valve;
a valve drive device configured to drive the throttle valve to control the opening degree of the throttle valve; and
a controller which is configured to set a target opening degree of the throttle valve based on the detected command signal and to control the valve drive device to cause the opening degree indicated by the detected opening degree signal to match the target opening degree; wherein
the controller is configured to set the target opening degree of the throttle valve to a smaller value than prior to exceeding a predetermined restricted opening degree threshold, when it is determined that at least one of the detected command signal and the detected opening degree signal is abnormal and when the driving speed or the engine speed which is detected by the speed associated value detecting device exceeds the predetermined restricted opening degree threshold.

9. A controller for a vehicle comprising:
an opening degree setting unit configured to set a target opening degree of a throttle valve based on plural detected command signals each indicating a driving power change command of an engine which is given by a driver;
a valve drive control unit which is configured to control the throttle valve so that an actual opening degree of the throttle valve matches the target opening degree set by the opening degree setting unit, based on a detected opening degree signal indicating an opening degree of the throttle valve; and an abnormality determiner unit configured to determine whether or not abnormality has occurred in at least one of the plural detected command signals;

wherein the abnormality determiner unit is configured to set the target opening degree of the throttle valve to a smaller value than when it is determined that the detected command signals are normal, and is configured to set, according to a driving state of the vehicle which changes during driving of the vehicle, a rule for finding the target opening degree based on the plural detected command signals, when it is determined that at least one of the plural detected command signals is abnormal, and wherein the controller is configured to set the target opening degree of the throttle valve such that a decrease rate of the target opening degree with respect to a target opening degree in a normal state, is changed according to the driving state of the vehicle, when the controller determines that at least one of the detected command signal and the detected opening degree signal is abnormal.

10. A vehicle comprising:
a driving state detecting device configured to detect a driving state of the vehicle which changes during driving of the vehicle;
a command signal output device configured to output a detected command signal indicating an engine driving power change command given by a driver;
an opening degree signal output device configured to output a detected opening degree signal indicating an opening degree of a throttle valve;
a valve drive device configured to drive the throttle valve to control an opening degree of the throttle valve; and
a controller which is configured to set a target opening degree of the throttle valve based on the detected command signal and to control the valve drive device to cause the opening degree indicated by the detected opening degree signal to match the target opening degree;

wherein the controller is configured to set, according to the driving state detected by the driving state detecting device, where the driving state changes during driving of the vehicle, the target opening degree of the throttle valve to a smaller value than when it is detected that the detected command signal and the detected opening degree signal are normal, when it is determined that at least one of the detected command signal and the detected opening degree signal is abnormal, and wherein the controller is configured to set the target opening degree of the throttle valve such that a decrease rate of the target opening degree with respect to a target opening degree in a normal state, is changed according to the driving state of the vehicle, when the controller determines that at least one of the detected command signal and the detected opening degree signal is abnormal.

11. The vehicle according to claim 10,
wherein the controller is configured to set the target opening degree of the throttle valve such that a decrease rate of the target opening degree corresponding to a higher speed is greater than a decrease rate of the target opening degree corresponding to a lower speed, when the controller determines that at least one of the detected command signal and the detected opening degree signal is abnormal.

12. The vehicle according to claim 11,
wherein the controller is configured to set the target opening degree of the throttle valve such that a decrease rate of the target opening degree corresponding to a higher driving speed, a higher engine speed, or a higher acceleration, is greater than a decrease rate of the target opening degree corresponding to a lower driving speed, a lower engine speed, or a lower acceleration, when the controller determines that at least one of the detected command signal and the detected opening degree signal is abnormal.

* * * * *